United States Patent [19]

Hujsak et al.

[11] 4,177,964

[45] Dec. 11, 1979

[54] DOCKING SYSTEM FOR SPACE STRUCTURES

[75] Inventors: Edward J. Hujsak, La Jolla; LeRoy E. Siden, San Diego, both of Calif.

[73] Assignee: General Dynamics Corporation, San Diego, Calif.

[21] Appl. No.: 940,538

[22] Filed: Sep. 8, 1978

[51] Int. Cl.² .............................................. B64G 1/00
[52] U.S. Cl. ..................................... 244/161; 33/286; 114/250; 294/94; 358/93
[58] Field of Search ...................... 244/161, 3, 135 A; 114/249, 250; 294/83 R, 93, 94, 95, 96; 358/93, 100, 108, 109; 33/286; 213/1.3

[56] References Cited

U.S. PATENT DOCUMENTS

| | | | |
|---|---|---|---|
| 3,476,140 | 11/1969 | Jusyk | 244/135 A |
| 3,508,723 | 4/1970 | Warren et al. | 244/161 |
| 3,737,117 | 6/1973 | Belew | 244/161 |
| 3,910,533 | 10/1975 | Cheatham et al. | 244/161 |
| 4,025,193 | 5/1977 | Pond et al. | 244/135 A |

Primary Examiner—Charles E. Frankfort
Attorney, Agent, or Firm—John R. Duncan

[57] ABSTRACT

A system for joining or docking large structures in space under remote, automatic control. As the two structures approach each other, a telescoping rigid boom on one structure is extended toward a socket on the other. The boom mount includes mechanisms providing a multidegree of freedom in pointing the boom. The end of the boom is directed into the socket whereupon a locking device holds it in place. Damping apparatus damps the relative motion between the structures. Boom retraction brings the structures together so that a final latching device can clamp the structures rigidly together.

8 Claims, 14 Drawing Figures

DOCKING SYSTEM FOR SPACE STRUCTURES

BACKGROUND OF THE INVENTION

This invention relates in general to space vehicle docking systems and, more specifically, to system for docking large structures in earth orbit by remote sensing and control.

A number of different devices to accomplish docking of space vehicles have been developed and put into use. Typical docking devices include those used in the Gemini, Apollo and Soyuz programs. These devices have worked well for single, relatively small, vehicles under direct manual control. However, plans are now being made for joining very large structures in orbit which will raise new problems resulting from the large size and mass of the structures. Typical problems include the inherent structural flexibility of such structures, their slow response to control forces and the necessity of remote automatic control. For example, accepted techniques of "driving" the two mating halves of a docking fixture together are not feasible from the standpoint of control capability needed and the impact loads and disturbances which occur.

SUMMARY OF THE INVENTION

The above problems, and others, are overcome by the space structure docking system of this invention which uses a remotely controlled extendable telescoping boom on a first structure to engage a socket on the second structure. Once the end of the boom enters the socket, a locking means holds it in place. Damping means the damp out of any relative motion between the structures. The two structures are moved toward each other by a boom retraction means. When the structures are in full contact, latch means are operated to rigidly secure the structures together.

The boom has multiple degrees of freedom, permitting rapid and accurate pointing under remote control, such as a target sensing television camera, during the socket locating and engaging phase. The boom actuators may also act as shock absorbers after socket engagement.

The boom end is locked within the socket by either a mechanically or electromechanically activated means which expands the boom end to fit securely within the socket.

Electrical connector means may be provided on the two halves of the docking means to permit completion of electrical circuits by slightly rotating on half of the docking means after completion of the latching operation.

BRIEF DESCRIPTION OF THE DRAWING

Details of the invention, and of a preferred embodiment thereof, will be further understood upon reference to the drawing, wherein.

DETAILED DESCRIPTION OF THE INVENTION

Figure 1:
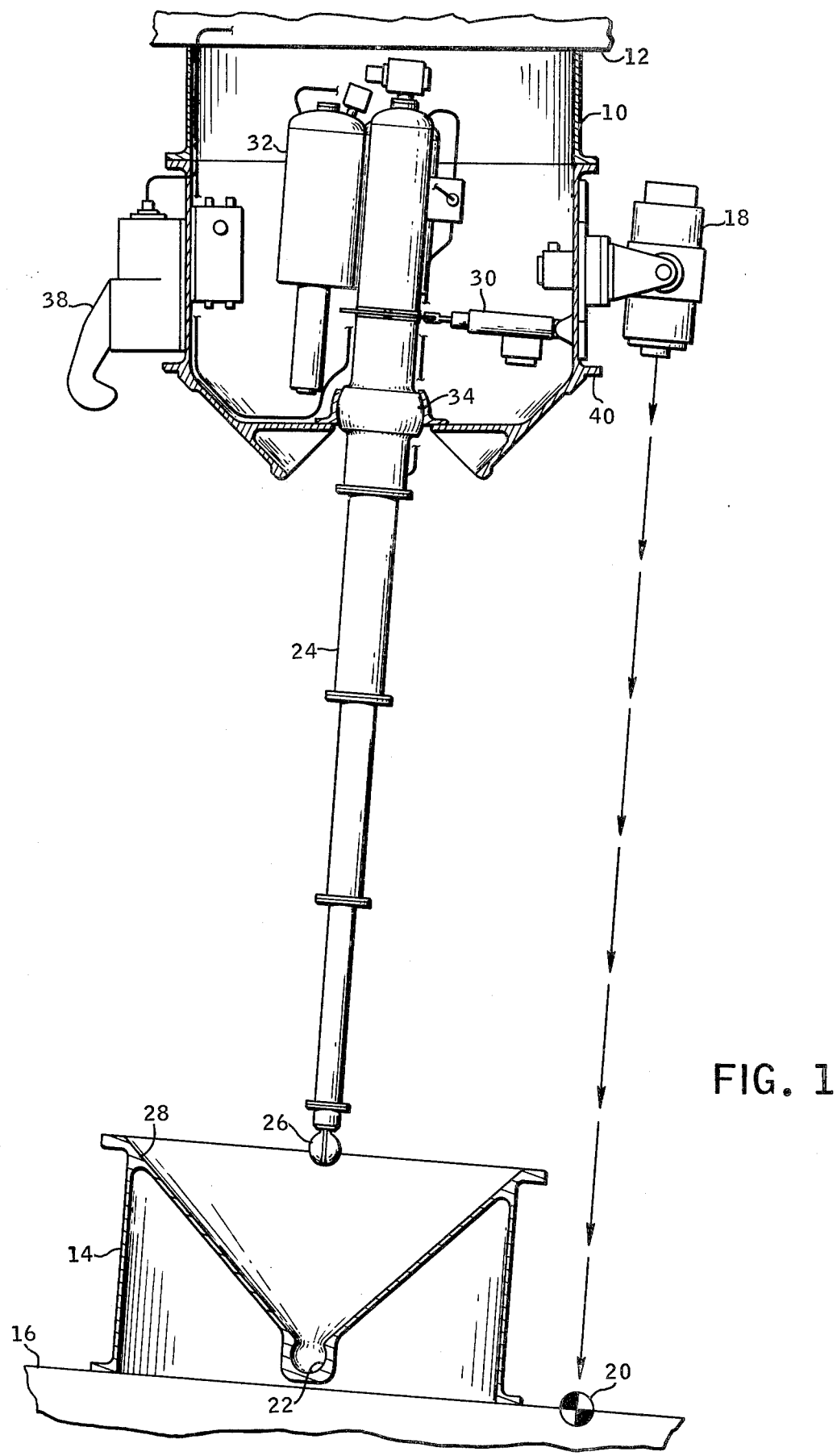
FIG. 1 is a plan view, partially cut away, of the docking device during the approach phase.

Referring now to FIG. 1, there is seen a space docking system shown during the approach phase a first docking mechanism 10 on an active vehicle 12 is moved toward a second docking mechanism 14 on a passive structure 16. Typically, structure 16 might be a very large space platform and vehicle 14 might be a further structure component. Since second docking mechanism 14 is totally passive and very simple, a large space platform could be provided with a number of them for possible future connection.

As the two structures approach each other, the relative movement of vehicle 12 can be remotely or automatically controlled by a system using a conventional television camera 18 and feedback system. Camera 18 typically locks onto a target schematically indicated at 20. Target 20 is spaced from socket 22 in docking mechanism 14 the same distance camera 18 is spaced from the axis of boom 24. Through conventional servo mechanisms (not shown) camera 18 continually points at target 20 and boom 24 follows the direction of camera 18. Thus, the end 26 of boom 24 is always aligned with socket 22. The entrance of docking mechanism 14 has an open conical surface 28 to guide boom end 26 into socket 22 in the event of slight misalignment as the vehicles approach each other.

When boom end 26 enters socket 22, a mechanism described in detail below causes boom end 26 to expand and firmly engage socket 22. Since boom 24 is hydraulically extended and retracted, as detailed below, it acts as a shock absorber, damping impact loads. Two hydraulic cylinders 30 at 90° to each other (one of which is seen in FIG. 1) serve to absorb transverse shocks and damp relative movement to aid in aligning the two halves of the docking mechanism.

A pair of hydraulic fluid reservoirs 32 (one of which is shown in FIG. 1) located 90° from each other, across from cylinders 30 provide hydraulic fluid for extending and retracting telescopic boom 24.

Boom 24 is mounted in a spherical bearing 34, permitting a multi-degree of freedom movement to follow camera 18 during approach.

Figure 2:
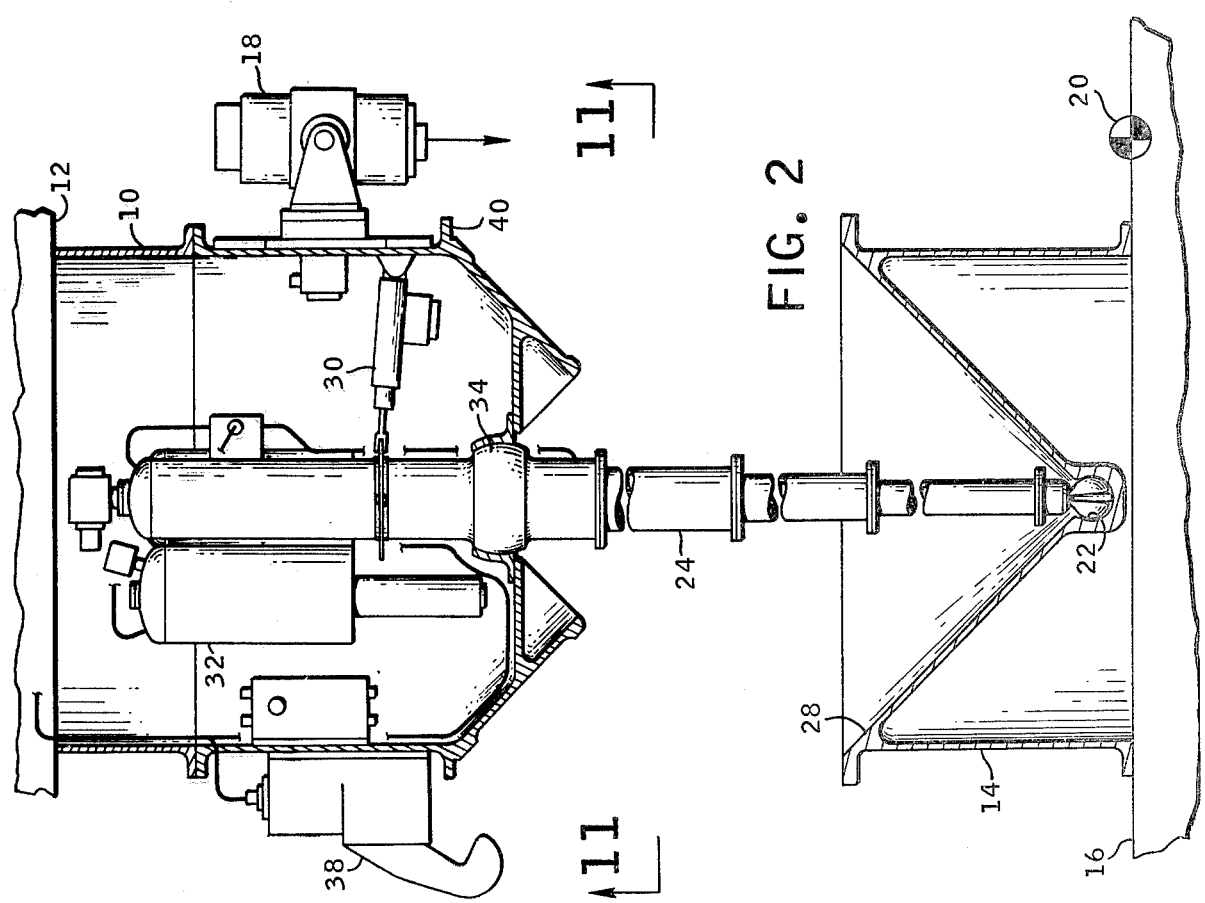
FIG. 2 is a plan view, partially cut away, of the docking device during the capture and draw-in phases.

The docking system is shown during the draw-in phase in FIG. 2. The boom end 26 has entered and expanded within socket 22, securing boom 24 to the platform docking mechanism 14. Pump 34 is operated to pump hydraulic fluid from boom 24 to reservoirs 32 to retract boom 24. Hydraulic cylinders 30 maintain boom 24 in the proper alignment during retraction.

Figure 3:
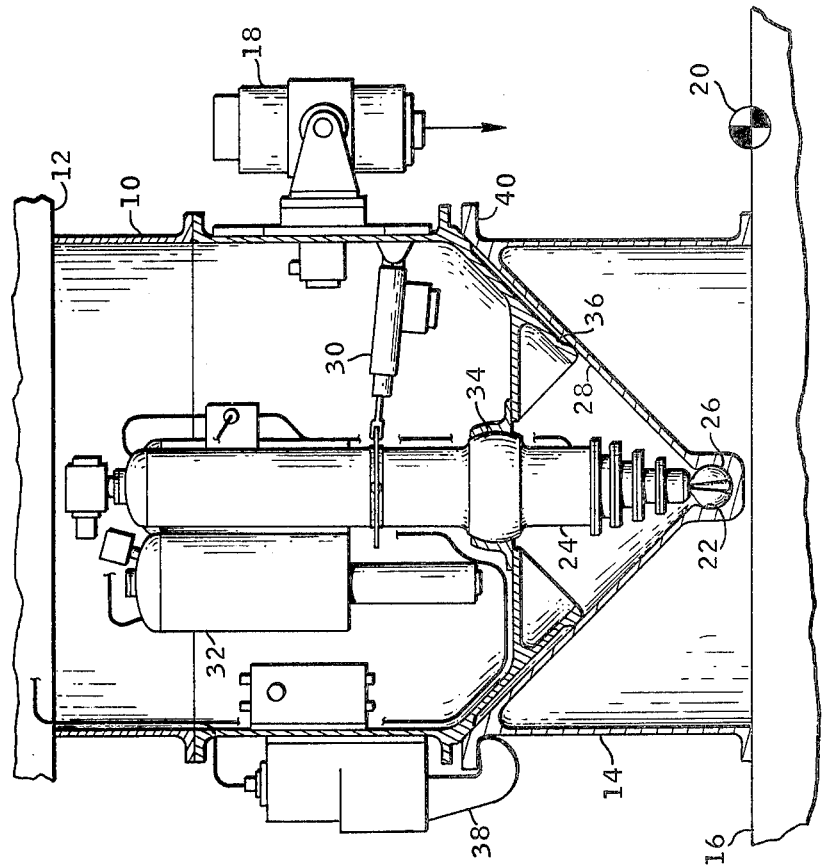
FIG. 3 is a plan view, partially cut-away, showing the docking device during the latched and clamped phase.

Final closure and clamp down of the two halves of the docking mechanism is illustrated in FIG. 3. Boom 24 is fully retracted, bringing lands on conical surface 36 on first docking mechanism 10 into contact with conical surface 28 on second docking mechanism 14. A plurality of spaced latch means 38 (one of which is shown) move over flange 40 on mechanism 14, then retract into clamping engagement with the flange. The two structures 12 and 16 are then securely and rigidly fastened together.

Figure 4A:
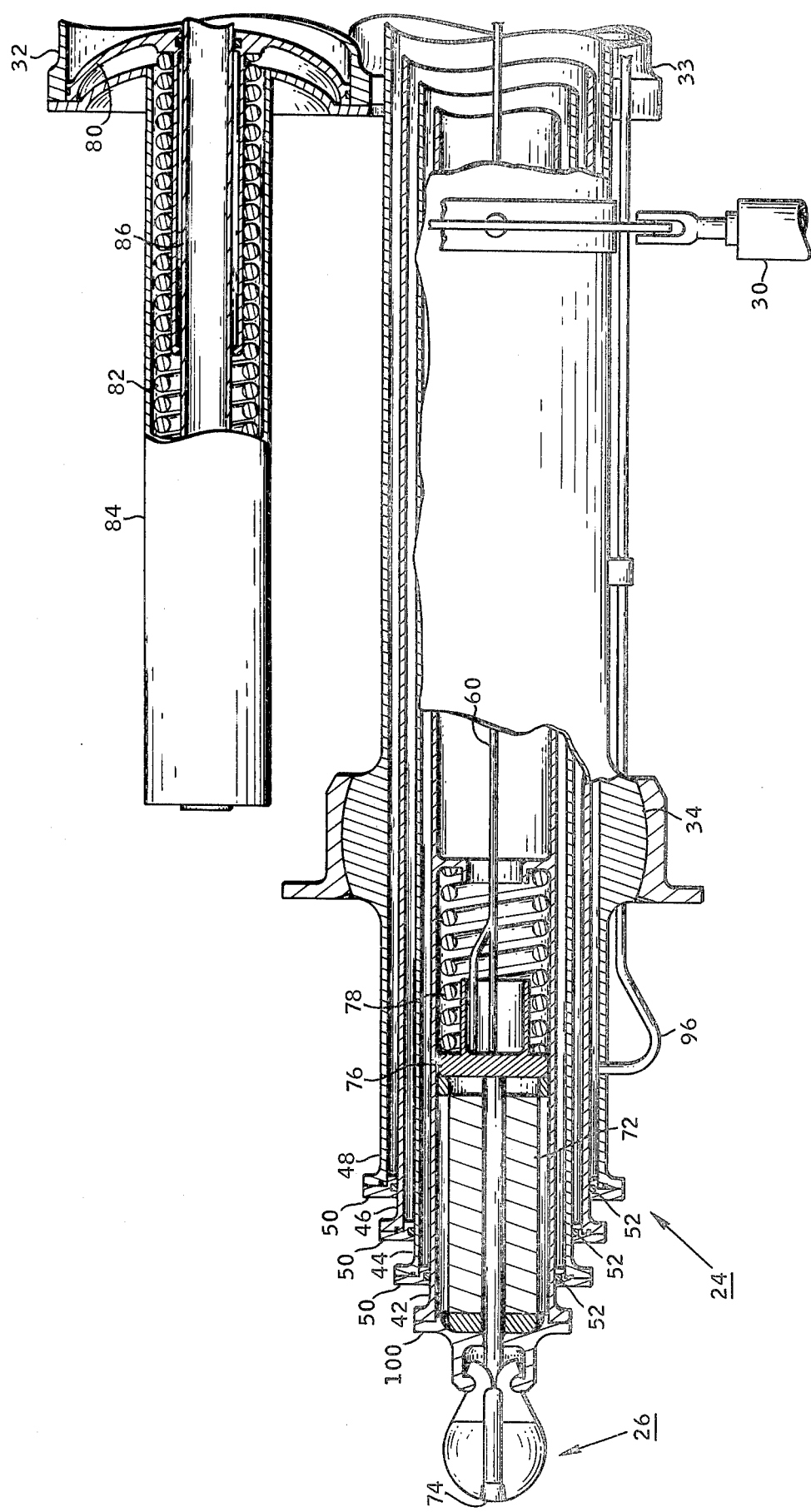
FIG. 4a is a detail view, partially in section, showing the boom mechanism in the retracted position.
Figure 4B:
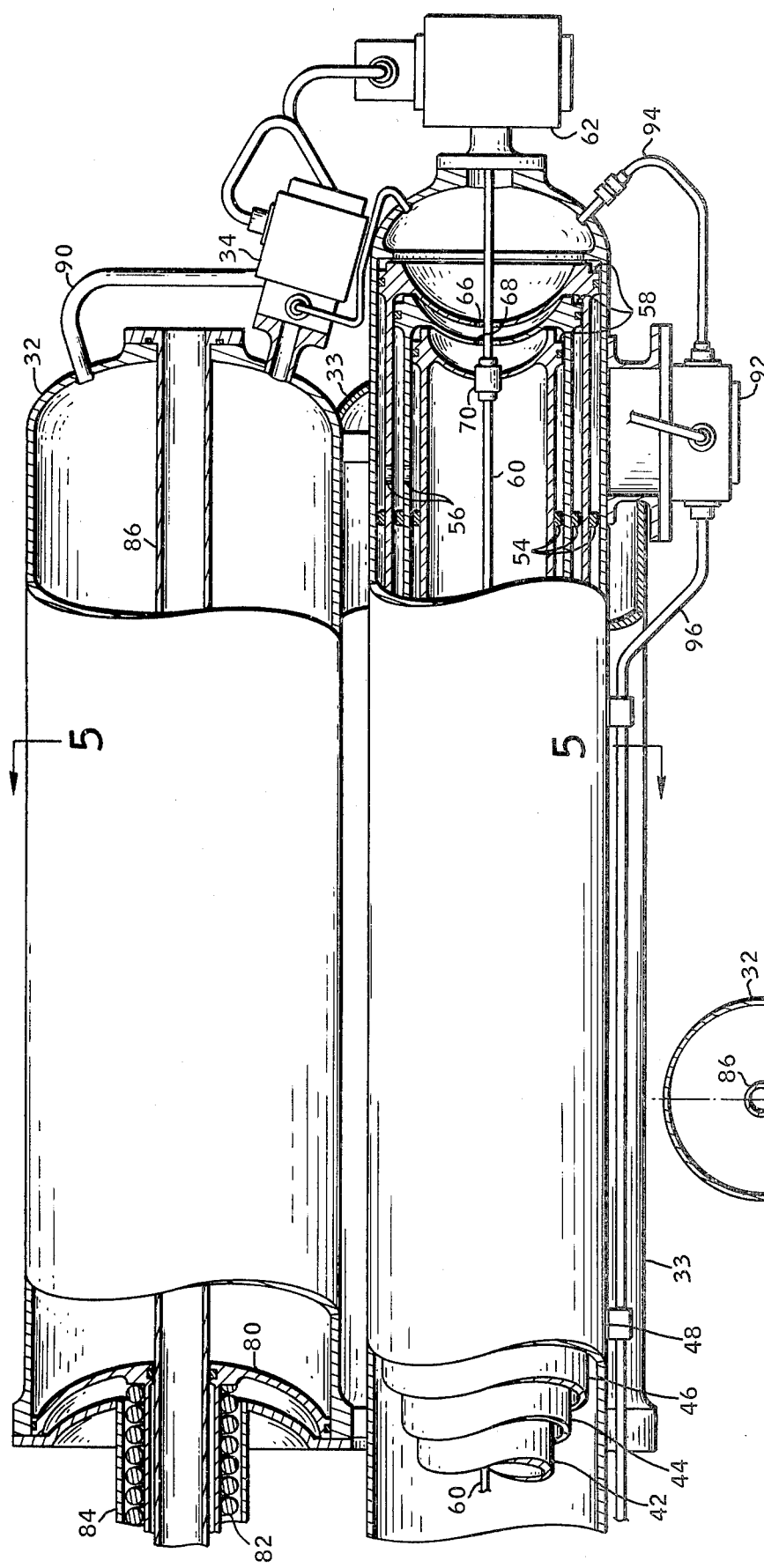
FIG. 4b is a detail view, partially in section, showing the boom activating hydraulic system and the attachment at the rear of the boom mechanism.

Details of the boom 24 and related components are shown, partially cut away or in section for clarity, in FIGS. 4a and 4b. Basically, boom 24 comprises a series of telescoping tubes 42, 44, 46 and 48. Each inner tube is longitudinally slidable in the next outer tube. Each of tubes 44, 46 and 48 has an end flange 50 and seal 52 to prevent leakage of hydraulic fluid between the tubes. Each of the three inner tubes 42, 44 and 46 includes an axially extending stop ring 54 which encounters a corresponding flange 50 to prevent an inner tube from moving beyond the next outer tube when boom 24 is fully extended. Bleed holes 56 are provided in the walls of the two inner tubes 44 and 46 to permit hydraulic fluid to pass into and out of the inter-tube space as the boom is retracted or extended. Upstanding shoulders 58, each including a seal ring, are provided at the inner end of each of the inner tubes 42, 44 and 46 to help guide the tubes for extension and retraction and to limit the passage of hydraulic fluid.

An electric cable 60 runs from a sealed cable reel unit 62 through openings 66 and 68 in the ends of tubes 44 and 46 and a seal 70 in the inner end of innermost tube 42, then down through tube 42 to a solenoid 72 at the outer end of tube 42. As seen in FIG. 4a, solenoid 72 is inactivated, so that rod 74 is in an extended position. Rod 74 is secured to a plate 76 which is biased toward the portion shown in FIG. 4a by coil spring 78. FIG. 4a shows boom end 26 in the expanded or "capture" position as discussed in detail in conjunction with the discussion of FIG. 7, below. When solenoid 72 is activated, as it is until capture is imminent, rod 74 is held back into tube 42 against the pressure of spring 78, as further detailed in the discussion of FIG. 6, below.

Figure 5:
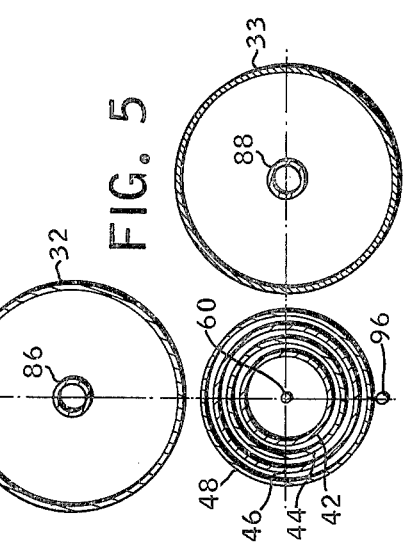
FIG. 5 is a section view, taken on line 5—5 in FIG. 4b, showing the relationship of the boom and hydraulic reservoirs.

As seen in FIGS. 4b and 5, hydraulic fluid for activating boom 24 is contained in two reservoirs 32 and 33 adjacent and parallel to the assembly of tubes 42, 44, 46 and 48. Pressure is maintained in each reservoir by a slidable plunger 80 pressed against fluid in the reservoir by a spring means 82 within housing 84. The spring means and plungers are guided by tube 86 which extend entirely through the reservoirs. An interconnect tube 90 connects the two reservoirs 32 and 33 to assure equal pressure levels in both reservoirs. A pump 34 pumps hydraulic fluid from the reservoirs into the head of tube 48 to extend boom 24. To retract boom 24, a conventional controller 92 allows fluid from the head of tube 48 to pass through tubes 94 and 96 to the far end of tube 48.

Figure 7:
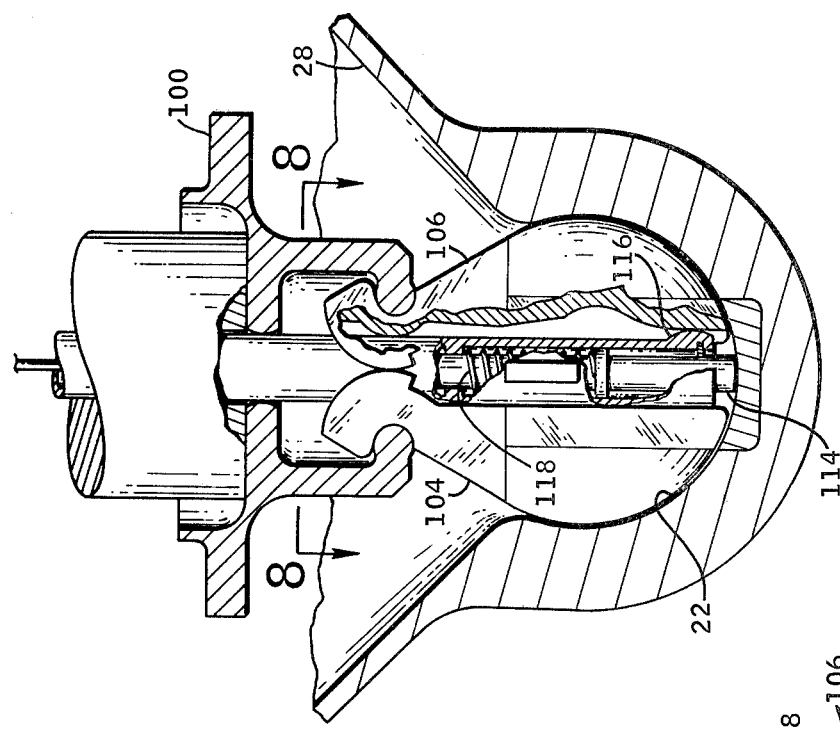
FIG. 7 is a detail plan view showing a first embodiment of the boom and capture means just after capture.
Figure 8:
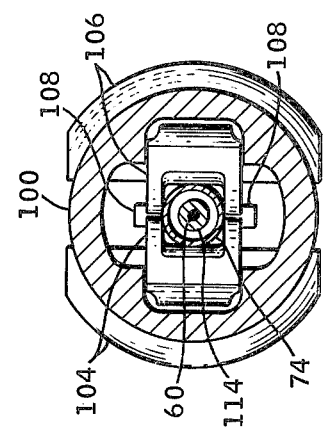
FIG. 8 is a section view taken on line 8—8 in FIG. 7 showing the capture surfaces.
Figure 6:
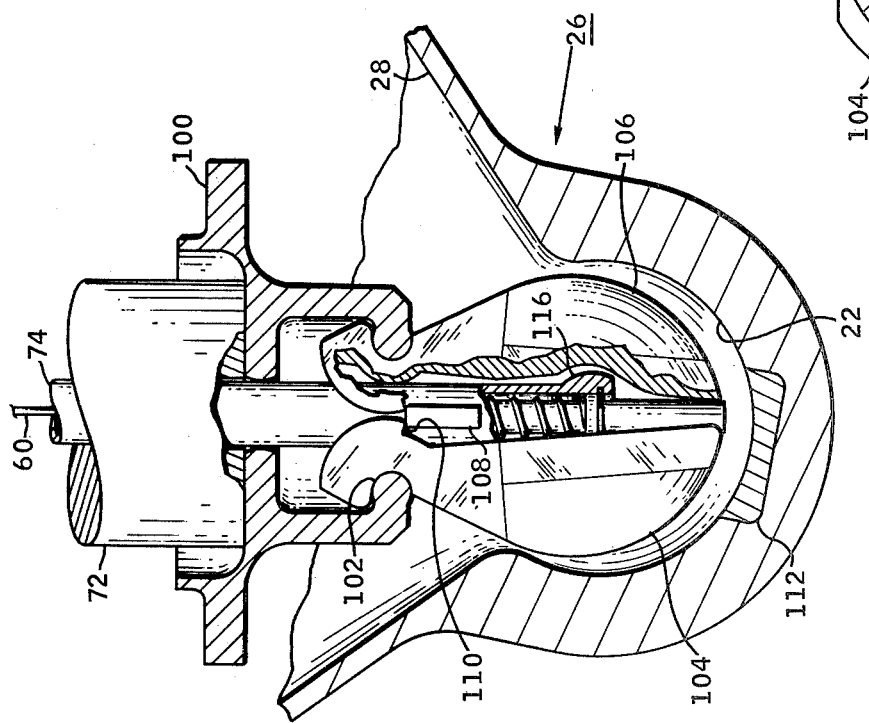
FIG. 6 is a detail plan view showing a first embodiment of the boom end capture means just before actuation.

Details of a first embodiment of the capture mechanism 26 before and after actuation are shown in FIGS. 6–8.

As seen in FIG. 6, end closure means 100 has a central opening through which rod 74 passes. As described above, rod 74 is spring biased downwardly as seen in FIG. 6 and is retractable by solenoid 72. Closure means 100 includes a pair of inwardly extending pivot means 102 about which a pair of shoes 104 and 106 are pivotable. Shoe 106 is partially cutaway to show the end of rod 74. A pair of ears 108 (one shown, the other being on the opposite side of rod 74) strike cam surfaces 110 on shoes 104 and 106 when rod is retracted by solenoid 72, causing the shoes to close.

A small permanent magnet 112 is embedded within socket 22 to act as an actuation trigger. As the probe end approaches magnet 112, a small conventional autotransformer 114 reacts to the magnetic field, generating a signal to de-energize solenoid 72. Spring 78 (as seen in FIG. 4a) drives rod 74 forward so that rounded ends 116 on rod 74 forces cam shoes 104 and 106 apart and into locking engagement with socket 22.

Autotransformer assembly 114 is spring loaded into an extended position within the end of rod 74 by a spring 118 and automatically is pressed back as the ends 116 of rod 74 move into the final position.

Figure 10:
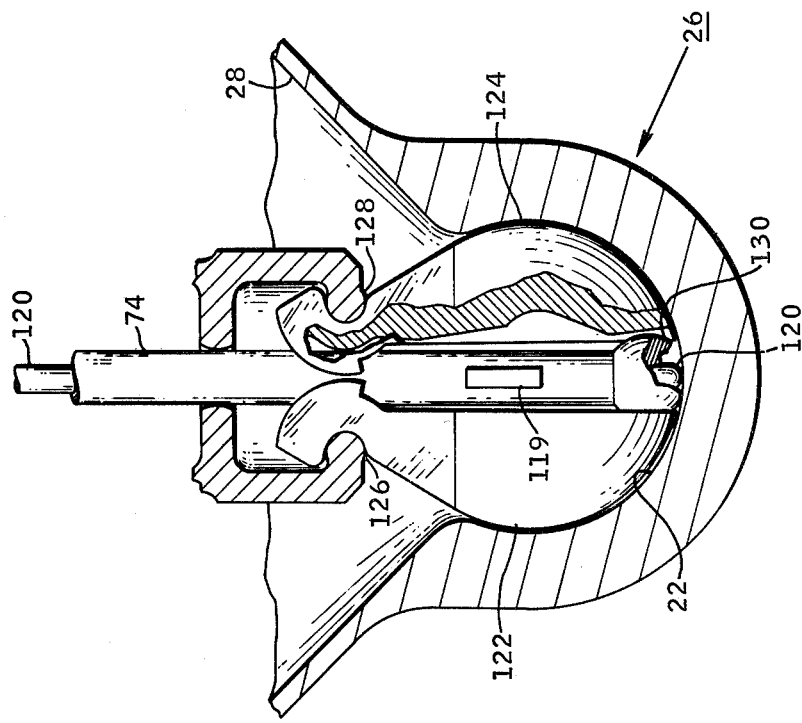
FIG. 10 is a detail plan view showing a second embodiment of the boom end capture means after actuation.
Figure 9:
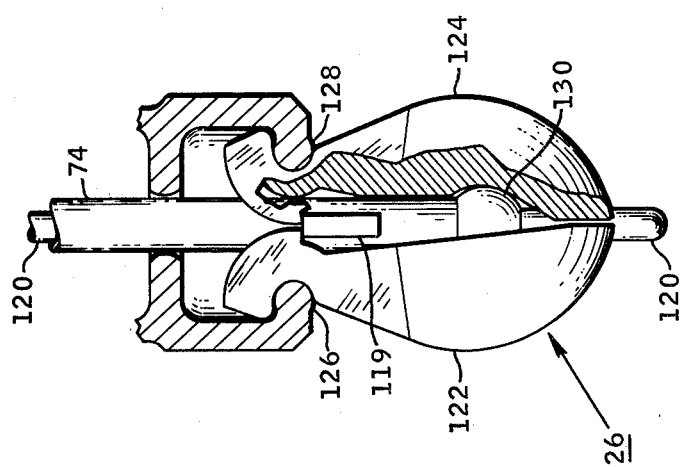
FIG. 9 is a detail plan view showing a second embodiment of the boom end capture means just before actuation.

A second embodiment of capture means 26 is illustrated in FIGS. 9 and 10. Before actuation, as seen in FIG. 9, rod 74 is held in a retracted position by a solenoid which overcomes an outwardly biasing spring of the sort illustrated at 72 and 78 in FIG. 4a. A switch operating shaft 120 extends through the length of rod 74 to a conventional electrical switch (not shown). A pair of shoes 122 and 124 are mounted for pivoting mount on a pair of shoe support lands 126 and 128. Shoe 124 is partially cut-away to show the spherical configuration 130 of the end of rod 74. Ears 119 on rod 74 bear against cam surfaces on shoes 122 and 124 and maintain them in the closed position.

As seen in FIG. 10, when capture means 26 enters socket 22, the end of switch actuation shaft 120 hits the bottom of the socket, a switch is actuated, turning off the solenoid and allowing the spring to move rod 74 downwardly, forcing spherical end 130 between shoes 122 and 124, expanding them into locking contact with socket 22. Switch shaft 120 is pushed up into the base of rod 74.

Upon completion of capture, boom 24 is retracted, latches 38 are operated to secure the two vehicles together as shown in FIG. 3. Even with all electrical and hydraulic power off, the capture means and latch means will stay in the locked position. For undocking, the procedure is reversed; latches 38 are released, boom 24 is extended and the capture means is released.

Figure 11:
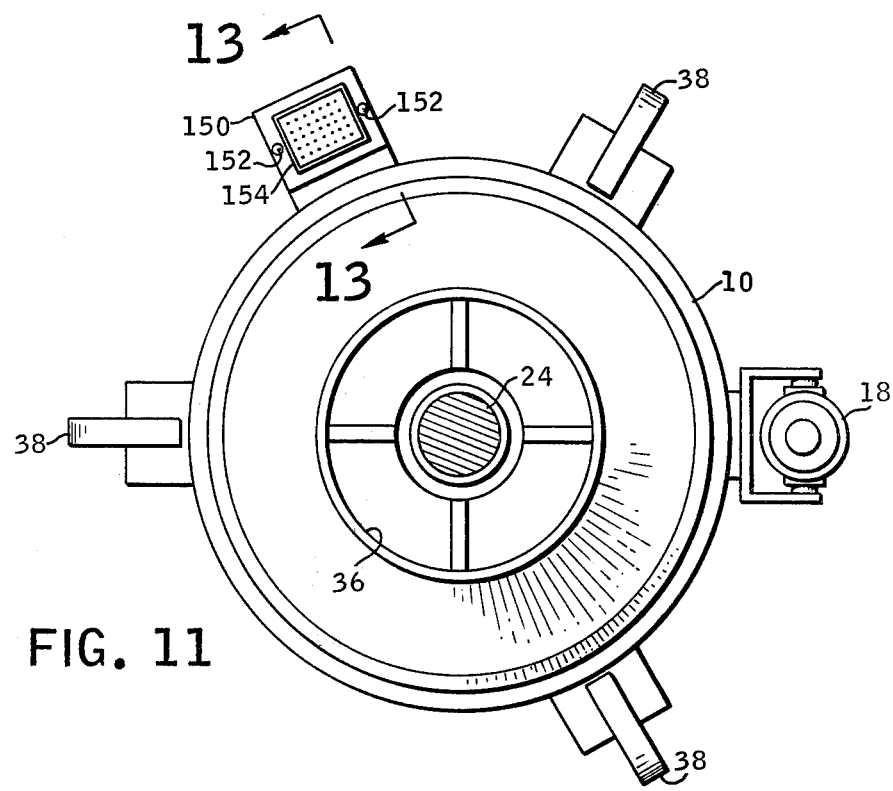
FIG. 11 is a sectional view taken on line 11—11 in FIG. 2.
Figure 12:
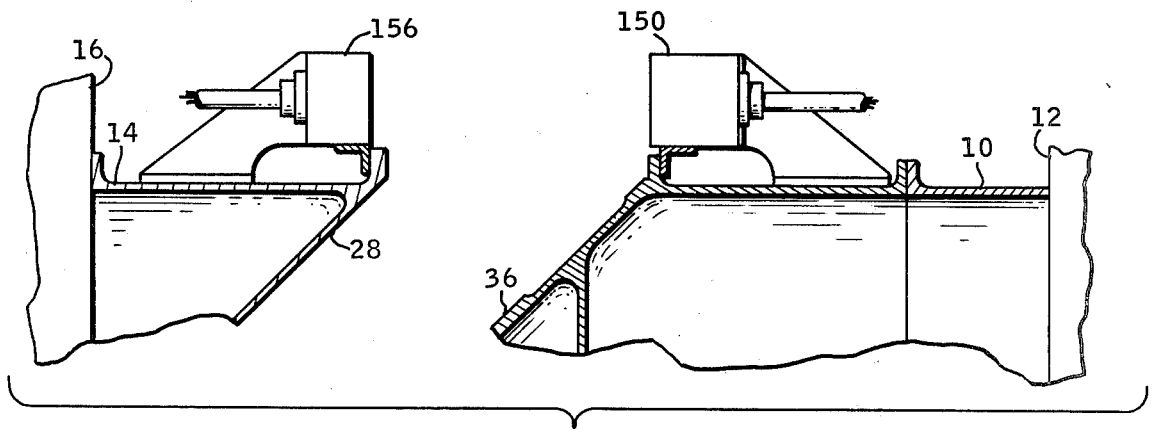
FIG. 12 is a side detail view showing the interconnect means during the approach phase.
Figure 13:
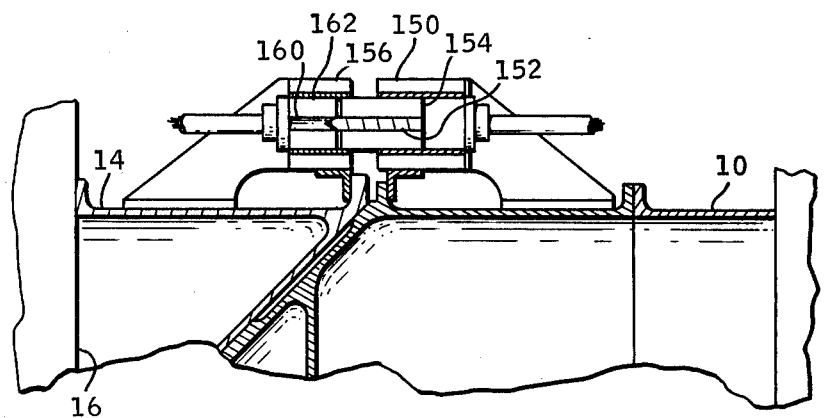
FIG. 13 is a sectional view, taken on line 13—13 in FIG. 11, illustrating completion of electrical interconnection.

Details of an interconnect means, which will permit connection of electrical, hydraulic or other lines between the active and passive structures, are provided in FIGS. 11, 12 and 13.

FIG. 11, which is essentially an end view of first docking mechanism 10, shows the relative position of latch means 38, camera 18 and first interconnect means 150 around mechanism 10. The first interconnect means 150 includes two extendable and retractable alignment pins 152 having pointed ends and an extendable and retractable conventional electrical plug 154. Pins 152 and plug 154 are moved by conventional hydraulic or electrical means (not shown) under either manual or automatic control. Of course, plug 154 could also include means for interconnecting hydraulic lines or other pipes.

As seen in FIG. 12, during approach pins 152 and plug 154 are retracted into first interconnect means 150. Second interconnect means 156 is mounted on docking mechanism 14 in the corresponding position. Second interconnect means 156 includes two holes sized to fit pins 152 and an electrical receptacle corresponding to plug 154.

Once docking is completed and latches 38 have been engaged, pins 152 are extended into holes 160 in second interconnect means 156. The two interconnect means have some flexibility, so that if they are slightly out of alignment, the pointed pins can move the means into exact alignment. Then plug 154 is extended into operational alignment with receptacle 162 in second interconnect means 156. The exterior of pins 152 and plug 154 can be accomplished manually, or may be part of an automatic sequence triggered by completion of latching latch means 38.

While specific components and proportions were described in the above description of preferred embodiments other components may be used, where suitable, with similar results. For example, if desired means may be provided to rotate the vehicles relative to each other after capture but prior to latching to provide suitable relative orientation, engage electrical interconnects, etc.

Other variations, applications and ramifications of this invention will occur to those skilled in the art upon reading this disclosure. These are intended to be included within the scope of this invention, as defined in the appended claims.

We claim:

1. A system for joining large structures in space which comprises:
   a concave generally conical receiving means on one structure;
   a rounded socket at the apex of said conical receiving means;
   a convex generally conical extending means on a second structure;
   an extendable and retractable boom extending out from the apex area of said convex means;
   said boom being movable about a spherical bearing at the point where said boom passes through said convex means;
   means for guiding the end of said boom towards said socket as said structures approach each other;
   means for locking said boom end in said socket upon entry of said end thereinto;
   means for retracting said boom whereby said structures are drawn toward each other and said concave and convex means are brought into engagement; and
   latch means for holding said convex and concave means in engagement.

2. The system according to claim 1 wherein said means for guiding said boom comprises a television camera spaced from said boom on said convex means, servo mechanisms causing said boom and the optical axis of said camera to remain parallel during boom movement and an optical target spaced from said socket the same distance said camera optical axis is spaced from said boom.

3. The system according to claim 1 wherein said boom is a telescoping boom extended and retracted by varying hydraulic pressure within said boom.

4. The system according to claim 1 further including hydraulic damping means to damp out relative movement in a plane perpendicular to said boom between the structures after engagement of said boom end with said socket.

5. The system according to claim 1 wherein said means for locking said boom end in said socket comprises a permanent magnet embedded in said socket, an autotransformer assembly in the boom end and expandable means at the end of said boom to expand into engagement with said socket when said autotransformer is actuated by close approach to said magnet.

6. The system according to claim 5 wherein said expandable means includes two shoes having inner cam surfaces and a rod within said shoes having a cam end movable between a first position allowing said shoes to lie close together and a second position in which said cam end and said inner cam surfaces are brought into engagement to force said shoes apart, said rod having spring means biasing said rod toward said second position and a solenoid means which when actuated holds said rod in said first position, and electrical means which deactivates said solenoid when said autotransformer closely approaches said magnet.

7. The system according to claim 1 wherein said means for locking said boom end in said socket comprises an electrical switch actuating push rod extending through said boom and slightly beyond said boom end so that as said boom end enters said socket the push rod engages the socket, closing the electrical switch which causes electrically driven means to expand said boom end into locking engagement with said socket.

8. The system according to claim 1 further including a first interconnect means mounted on one of said structures and having extendable alignment pins and an extendable interconnect plug and a second interconnect means on the other structure having alignment holes and an interconnect receptacle, said two interconnect means located so as to be in substantial alignment upon completion of docking and latching of the two structures together, and further including means to extend said alignment pins into said alignment holes to assure proper alignment and means to extend said plug into operative engagement with said receptacle.

* * * * *